US007813888B2

(12) United States Patent
Vian et al.

(10) Patent No.: US 7,813,888 B2
(45) Date of Patent: Oct. 12, 2010

(54) AUTONOMOUS VEHICLE RAPID DEVELOPMENT TESTBED SYSTEMS AND METHODS

(75) Inventors: John L. Vian, Renton, WA (US); Ronald C. Provine, Seattle, WA (US); Stefan R. Bieniawski, Seattle, WA (US); Emad W. Saad, Renton, WA (US); Paul E. R. Pigg, Seattle, WA (US); Gregory J. Clark, Seattle, WA (US); Ali R. Mansouri, Bothell, WA (US); Khaled Abdel-Motagaly, Bellevue, WA (US); Charles A. Erignac, Seattle, WA (US); James J. Troy, Issaquah, WA (US); Paul Murray, Woodinville, WA (US); Jonathan P. How, Arlington, MA (US); Mario J. Valenti, Cambridge, MA (US); Brett M. Bethke, Cambridge, MA (US)

(73) Assignee: The Boeing Company, Chicago, IL (US)

( * ) Notice: Subject to any disclaimer, the term of this patent is extended or adjusted under 35 U.S.C. 154(b) by 1085 days.

(21) Appl. No.: 11/459,617

(22) Filed: Jul. 24, 2006

(65) Prior Publication Data
US 2008/0033684 A1    Feb. 7, 2008

(51) Int. Cl.
*G06F 19/00* (2006.01)
*G06F 17/40* (2006.01)
*G05D 1/00* (2006.01)

(52) U.S. Cl. .......................... 702/113; 702/1; 702/127; 702/187; 702/189; 702/108; 71/36; 71/37

(58) Field of Classification Search ................. 702/113, 702/1, 127, 187, 189, 108; 701/1, 36, 37
See application file for complete search history.

(56) References Cited

U.S. PATENT DOCUMENTS 4,654,949 A    4/1987 Pryor (Continued)

FOREIGN PATENT DOCUMENTS

DE    19731724    1/1999

(Continued)

OTHER PUBLICATIONS

PCT Intl Search Report and Written Opinion for Application No. PCT/US2007/011138, dated Dec. 4, 2008, 24 pgs.

(Continued)

*Primary Examiner*—Thomas G Black
*Assistant Examiner*—Wae Louie
(74) *Attorney, Agent, or Firm*—Lee & Hayes, PLLC

(57) ABSTRACT

Systems and methods for development testing of vehicles and components are disclosed. In one embodiment, a system includes a position reference system and a command and control architecture. The position reference system is configured to repetitively measure one or more position and motion characteristics of one or more vehicles operating within a control volume. The command and control architecture is configured to receive the repetitively measured characteristics from the position reference system, and to determine corresponding control signals based thereon. The control signals are then transmitted to the one or more vehicles to control at least one of position, movement, and stabilization of the one or more vehicles in a closed-loop feedback manner. The system may further include a health monitoring component configured to monitor health conditions of the one or more vehicles, the control signals being determined at least in part on the health conditions.

35 Claims, 10 Drawing Sheets

U.S. PATENT DOCUMENTS

| | | | |
|---|---|---|---|
| 5,109,345 | A | 4/1992 | Dabney et al. |
| 5,148,591 | A | 9/1992 | Pryor |
| 5,281,901 | A * | 1/1994 | Yardley et al. ............ 318/587 |
| 5,380,978 | A | 1/1995 | Pryor |
| 5,489,830 | A | 2/1996 | Fernandez |
| 5,506,682 | A | 4/1996 | Pryor |
| 5,637,826 | A | 6/1997 | Bessacini et al. |
| 5,646,845 | A * | 7/1997 | Gudat et al. .................. 701/41 |
| 5,721,680 | A | 2/1998 | Van Cleve et al. |
| 5,909,218 | A | 6/1999 | Naka et al. |
| 6,114,976 | A * | 9/2000 | Vian .......................... 340/945 |
| 6,317,658 | B1 * | 11/2001 | Vian ............................ 701/1 |
| 6,460,004 | B2 | 10/2002 | Greer et al. |
| 6,720,949 | B1 | 4/2004 | Pryor et al. |
| 6,896,220 | B2 | 5/2005 | McKendree et al. |
| 6,910,657 | B2 * | 6/2005 | Schneider ................. 244/3.11 |
| 6,938,853 | B2 * | 9/2005 | Pines et al. .................... 244/11 |
| 6,955,324 | B2 * | 10/2005 | Tanielian ................... 244/3.13 |
| 7,039,367 | B1 * | 5/2006 | Kucik ........................... 455/96 |
| 7,054,724 | B2 | 5/2006 | Koshizen et al. |
| 7,099,747 | B2 | 8/2006 | Mikami et al. |
| 7,313,463 | B2 | 12/2007 | Herr et al. |
| 7,363,111 | B2 * | 4/2008 | Vian et al. ................. 700/279 |
| 7,400,943 | B2 * | 7/2008 | Vian et al. ................. 700/279 |
| 7,400,950 | B2 | 7/2008 | Reich |
| 7,445,536 | B2 * | 11/2008 | Lee et al. ...................... 446/37 |
| 7,731,588 | B2 | 6/2010 | Templeman |
| 7,742,036 | B2 | 6/2010 | Grant et al. |
| 2002/0142701 | A1 | 10/2002 | Rosenberg |
| 2003/0090682 | A1 | 5/2003 | Gooch et al. |
| 2004/0073359 | A1 | 4/2004 | Ichijo et al. |
| 2004/0221648 | A1 * | 11/2004 | Wu et al. ................. 73/504.02 |
| 2004/0249520 | A1 * | 12/2004 | Maine ........................... 701/3 |
| 2005/0001091 | A1 * | 1/2005 | Raney ........................ 244/11 |
| 2005/0027406 | A1 | 2/2005 | Nonami et al. |
| 2005/0125099 | A1 | 6/2005 | Mikami et al. |
| 2006/0082546 | A1 | 4/2006 | Wey |
| 2006/0121818 | A1 * | 6/2006 | Lee et al. ...................... 446/37 |
| 2006/0238403 | A1 * | 10/2006 | Golan et al. .................. 342/62 |
| 2007/0200027 | A1 * | 8/2007 | Johnson ...................... 244/3.1 |
| 2008/0033684 | A1 * | 2/2008 | Vian et al. .................. 702/113 |
| 2008/0125896 | A1 * | 5/2008 | Troy et al. .................. 700/110 |
| 2009/0152391 | A1 * | 6/2009 | McWhirk .................... 244/30 |
| 2009/0315777 | A1 * | 12/2009 | Baughman ................. 342/457 |

FOREIGN PATENT DOCUMENTS

| | | |
|---|---|---|
| GB | 2345952 | 7/2000 |
| WO | WO9918555 | 4/1999 |
| WO | WO03027599 | 4/2003 |
| WO | WO2005003676 | 1/2005 |

OTHER PUBLICATIONS

McNeely et al, "Six Degree-of-Freedom Haptic Rendering Using Voxel Sampling," Proc. ACM SIGGRAPH 99 Conf., Los Angeles, CA, Aug. 1999, pp. 401-408.

McNeely, et al, "Voxel-Based 6-DOF Haptic Rendering Improvements," Haptics-e, vol. 3, No. 7, Jan. 2006, 12 pgs.

Troy, et al, "Closed-Loop Motion Capture Feedback Control," (In Review), 2006, 2 pgs.

Troy, "Haptic Control of a Simplified Human Model with Multibody Dynamics," Phantom Users Group Conf., Aspen, CO, Oct. 2000, pp. 43-46.

Lam et al., "Tele-operating a UAV using Haptics—Modeling the Neuromuscular System", Systems, Man and Cybernetics, 2005 IEEE International Conference on Waikoloa, HI, Oct. 10-12, 2005, vol. 3, 21 pgs.

Carlson et al, "Reliability Analysis of Mobile Robots", Robotics and Automation, 2003, Proceedings ICRA 03, IEEE Intl Conf on Sep. 2003, vol. 1, 8 pages.

Castillo-Effen et al, "Modeling and Visualization of Multiple Autonomous Heterogeneous Vehicles", Systems, Man and Cybernetics, 2005 IEEE Intl Conference, Oct. 2005, vol. 3, 9 pages.

Chung et al, "A Platform for Cooperative and Coordinated Control of Multiple Vehicles", In Proc. of the 3rd Conf on Cooperative Control and Optimization, Dec. 2002, Chapter 1, pp. 1-33.

Cremean et al, "The Caltech Multi-Vehicle Wireless Testbed", Decision and Control, 2002, Proceedings of the 41st IEEE Conference, Dec. 2002, vol. 1, 3 pages.

Holland et al., "Beyond Swarm Intelligence: The Ultraswarm", Swarm Intelligence Symposium, 2005, SIS 2005, Proceedings 2005 IEEE, Jun. 2005, 8 pages.

Nardi et al, "SwarMAV: A Swarm of Miniature Aerial Vehicles", 21st Bristol Interl UAV Systems Conf, Apr. 2006, 9 pages.

Narli et al, "A Hardware-in-the-Loop Test Rig for Designing Near-Earth Aerial Robotics", Proceedings of the 2006 IEEE Internl Conference on Robotics and Automation, Orlando, Florida, May 2006, pp. 2509-2514.

Rizos, "Pseudolite Augmentation of Gps", presented at workshop on Geolocation and Navigation technology to support environmental geophysical mapping applications, organized by Strategic Environmental Research and Development Prog and Environmental Security Technology Certif Prog, May 2005, 15 pages.

Vachtsevanos et al, "From Mission Planning to Flight Control of Unmanned Aerial Vehicles: Strategies and Implementation Tools", Annual Reviews in Control, 29 (2005), pp. 101-115.

* cited by examiner

AUTONOMOUS VEHICLE RAPID DEVELOPMENT TESTBED SYSTEMS AND METHODS

CROSS REFERENCE TO RELATED APPLICATIONS

This patent application is related to co-pending, commonly-owned U.S. patent application Ser. No. 11/459,631 entitled "Closed-Loop Feedback Control of Vehicles Using Motion Capture Systems" filed concurrently herewith on Jul. 24, 2006, which application is incorporated herein by reference.

FIELD OF THE INVENTION

This invention relates generally to systems and methods for rapid development and testing of algorithms and configurations of vehicles, including manned and unmanned flight vehicles, as well as water and land-based vehicles.

BACKGROUND OF THE INVENTION

Existing methods of developing and testing vehicles, including air, water, and land-based vehicles, typically involve both computer simulations and prototype testing. Unfortunately, computer simulations may be relatively time-consuming to perform and may undesirably simplify many of the complexities of the actual system. Similarly, prototype testing may be undesirably expensive. In the case of flight vehicles, conventional systems such as the BAT Unmanned Aerial Vehicle available from MLB Company of Mountain View, Calif., may only yield a relatively limited number of flight hours and conditions due to operating costs, logistical issues, safety regulations, and other factors.

Although prior art methods of developing and testing vehicles have achieved desirable results, there is room for improvement. More specifically, methods and systems that enable development and testing of algorithms and configurations of vehicles to be performed rapidly, accurately, and economically would have significant utility.

SUMMARY OF THE INVENTION

The present invention is directed to systems and methods for rapid development and testing of vehicles and vehicle components. Embodiments of the invention may advantageously provide a dramatic increase in test capability, allowing new vehicles (including air, water, and land-based vehicles) and vehicle components (including hardware and software components) to be more investigated and developed more rapidly, efficiently, and cost effectively in comparison with prior art systems and methods.

In one embodiment, a system for controllably operating one or more vehicles includes a position reference system and a command and control architecture. The position reference system is configured to repetitively measure one or more position and motion characteristics of the one or more vehicles as the one or more vehicles are operating within a control volume. The command and control architecture is configured to receive the repetitively measured one or more position and motion characteristics from the position reference system, and to determine corresponding control signals (in a centralized control mode of operation) based on the repetitively measured one or more position and motion characteristics from the position reference system. The control signals are then transmitted to the one or more vehicles operating within the control volume to control at least one of position, movement, and stabilization of the one or more vehicles in a closed-loop feedback manner. In an alternate embodiment, the system operates in a distributed control mode of operation in which the control signals are determined by onboard processing components located on the vehicles that receive the information measured by the position reference system, and determine the control signals of the associated vehicle.

In a further embodiment, the command and control architecture further includes a health monitoring component configured to receive health monitoring information from the one or more vehicles, and to assess a health condition of the one or more vehicles based on the received health monitoring information. The command and control architecture may be further configured to determine the corresponding control signals based at least in part on the assessed health condition of the one or more vehicles.

In yet another embodiment, a method of operating one or more vehicles includes measuring one or more stability and control characteristics of the one or more vehicles using a position reference system. The measured one or more stability and control characteristics are received from the position reference system, and a command signal is determined based on the one or more stability and control characteristics. The command signal is transmitted to the one or more vehicles operating within the control volume to control the one or more stability and control characteristics of the one or more vehicles in a closed-loop feedback manner.

BRIEF DESCRIPTION OF THE DRAWINGS

Embodiments of the present invention are described in detail below with reference to the following drawings.

DETAILED DESCRIPTION

The present invention relates to systems and methods for rapid development and testing of algorithms and configurations of vehicles, including manned and unmanned flight vehicles, as well as water and land-based vehicles. Many specific details of certain embodiments of the invention are set forth in the following description and in FIGS. 1-14 to provide a thorough understanding of such embodiments. One skilled in the art, however, will understand that the present invention may have additional embodiments, or that the present invention may be practiced without several of the details described in the following description.

In general, systems and methods in accordance with embodiments of the present invention advantageously allow for rapid development and testing of a wide variety of vehicles and vehicle components (hardware and software) in a controlled environment. More specifically, embodiments of the invention may enable new software systems, avionics systems, control algorithms, computer hardware components, sensors, configurations, or other suitable parameters of interest to be quickly and repeatedly tested using one or multiple test vehicles. Because embodiments of the present invention may be scaled to fit within, for example, a suitable laboratory environment, testing and development of new vehicles and vehicle components may be performed rapidly, efficiently, and cost effectively. Thus, embodiments of the invention may provide a dramatic increase in test capability, allowing new vehicles (including air, water, and land-based vehicles) and vehicle components to be more quickly investigated and developed at lower cost.

Figure 1:
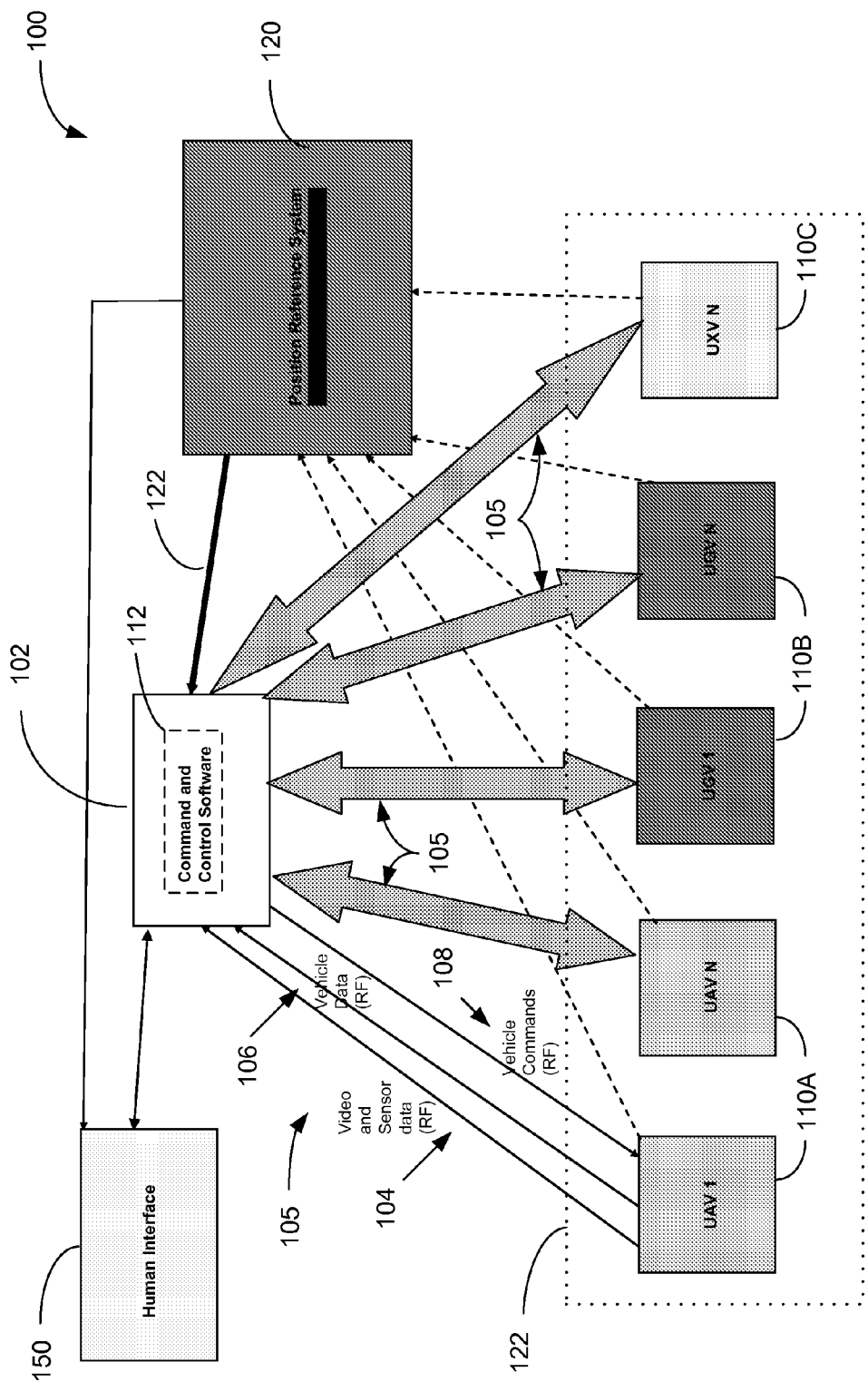
FIG. 1 is a schematic view of a development system for developing and testing vehicles and vehicle components in accordance with an embodiment of the invention.

FIG. 1 is a schematic view of a development system 100 for developing and testing vehicles and vehicle components in accordance with an embodiment of the invention. In this embodiment, the development system 100 includes a command and control computer 102 operatively coupled to a position reference system 120 and to a human interface 150. A plurality of test vehicles 110 are operatively positioned within a control space 122 monitored by the position reference system 120 during operation of the development system 100. As shown in FIG. 1, the test vehicles 110 may include Unmanned Aerial Vehicles (UAVs) 110A, Unmanned Ground Vehicles (UGVs) 110B, or any other suitable type of test vehicles 110C.

The command and control computer 102 operatively communicates with each of the test vehicles 110 via a communications link 105, which may be a wireless link, wire-based link, fiber-optic link, or any other suitable type of communications link. Each communications link 105 carries signals and data between the command and control computer 102 and the test vehicles 110. For example, in the embodiment shown in FIG. 1, the command and control computer 102 is configured to receive video and sensor signals 104 and health monitoring signals 106 from the test vehicles 110, and to transmit appropriate command signals 108 to the test vehicles 110. A command and control software program 112 may be implemented on the command and control computer 102 to perform a variety of functions associated with monitoring and controlling the test vehicles 110 and the various components of the development system 100. Alternately, the command and control computer 102 may include one or more programmable hardware components configured to perform one or more of these functions.

In operation, the command and control computer 102 causes appropriate command signals 108 to be transmitted to the one or more of the test vehicles 110, directing the test vehicles 110 to perform desired activities or functions. For example, the one or more UAV test vehicles 110A may be directed to fly in a desired flight path and to collect desired information using an onboard sensor. Similarly, the UGV and other test vehicles 110B, 110C may be directed to traverse a desired ground path, collect information, or perform other desired activities. The test vehicles 110 may be commanded to move independently of one another, or alternately, two or more of the test vehicles 110 may be commanded to move in a coordinated manner, such as in flocking, swarming, or ultraswarming movements, as described more fully, for example, in *Beyond Swarm Intelligence: The Ultraswarm*, presented at the IEEE Swarm Intelligence Symposium by Holland et al., Jun. 8, 2005, incorporated herein by reference.

During movement of the test vehicles 110 within the control space 122, the position reference system 120 monitors the positions of the test vehicles 110 and provides position feedback information 122 to the command and control computer 102. The command and control computer 102 compares the position feedback information 122 with the anticipated or desired positions of the test vehicles 110, and causes appropriate command signals 108 to be transmitted to the test vehicles 110 via the communication links 105 to controllably adjust (or maintain) the positions of the test vehicles 110 in their desired positions or along their desired headings. Thus, the position reference system 120 provides the development system 100 with a closed-loop feedback control capability for controllably adjusting the positions and courses of movement of the test vehicles 110. More specifically, the position reference system 120 may advantageously provide closed-loop feedback information 122 that enables the command and control computer 102 to determine and control not only positions and movements, but also attitude and stabilization control commands for proper control and stabilization of the test vehicles 110.

Figure 2:
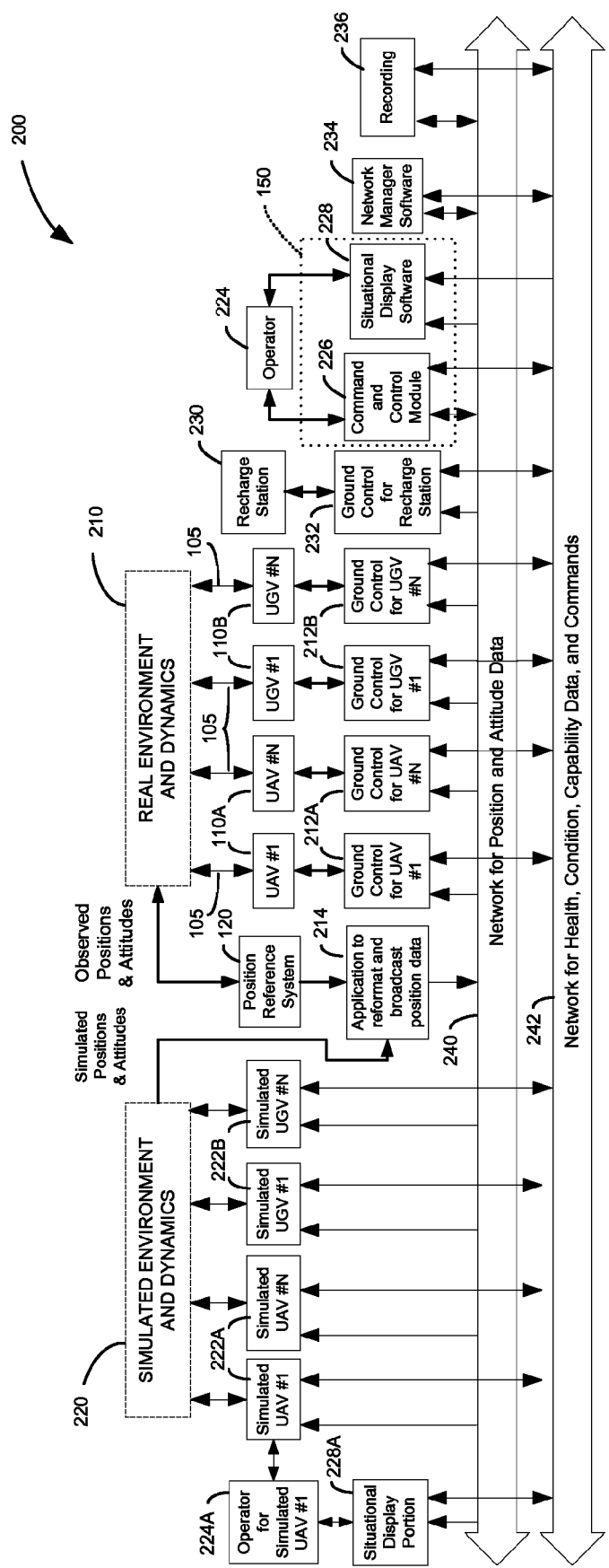
FIG. 2 is a schematic view of a command and control architecture of the development system of FIG. 1 in accordance with a particular embodiment of the invention.

Specific embodiments will now be described in greater detail below in order to facilitate a more thorough understanding of various aspects of systems and methods in accordance with the invention. For example, FIG. 2 is a schematic view of a command and control architecture 200 of the development system 100 of FIG. 1 in accordance with a particular embodiment of the invention. In this embodiment, the command and control architecture 200 includes an interface with the real environment and with the corresponding real dynamics 210 and is configured to perform computations and data management associated with the test vehicles 110 (for simplicity, only the UAV test vehicles 110A and UGV test vehicles 110B are depicted in FIG. 2) within the control space 122. The real environment and dynamics interface 210 may reside on the command and control computer 102 as, for example, part of the command and control software 112. Each test vehicle 110 communicates via the corresponding communication link 105 with the real environment and dynamics interface 210.

As further shown in FIG. 2, the command and control architecture 200 further includes a vehicle control unit 212 for each of the test vehicles 110. Each vehicle control unit 212 may be located on board the respective test vehicle 110, such as for manned test vehicles, or alternately, may be separate (or remote) from the test vehicle 110 (e.g. a ground control unit, air-borne control unit, sea-borne control unit, etc.) as shown in FIG. 2. The vehicle control units 212 operatively communicate with a control data network 240 and with a health monitoring network 242.

The real environment and dynamics functionality 210 also operatively interacts with the position reference system 120. It will be appreciated that the position reference system 120 may be any suitable type of system capable of measuring the positions and movements of the test vehicles 110 within the control space 122. In preferred embodiments, the position reference system 120 is capable of measuring each of the six degrees of freedom that define the positions and movements of each test vehicle 110. For example, embodiments of suitable position reference systems may include laser scanner systems, such as those systems commercially-available from Mensi, Inc. of Alpharetta, Ga., and laser radar systems, such as those generally disclosed, for example, in U.S. Pat. No. 5,202,742 issued to Frank et al., U.S. Pat. No. 5,266,955 issued to Izumi et al., and U.S. Pat. No. 5,724,124 issued to Kai. In other embodiments, position reference systems may include imaging systems such as the Cyrax laser-based imaging system commercially-available from Cyra Technologies, Inc. of San Ramon, Calif. In further embodiments, suitable position reference systems may include radar and laser radar systems, such as, for example, the LR200 laser radar system commercially-available from Leica Geosystems, Inc. of Heerbrugg, Switzerland. Alternately, position reference systems may include global positioning systems (GPS) and infrared global positioning systems (IRGPS), such as those systems generally disclosed, for example, in U.S. Pat. No. 5,589,835 issued to Gildea et al., U.S. Pat. No. 6,452,668 B1, issued to Pratt, and U.S. Pat. Nos. 6,501,543 B2, 6,535,282 B2, 6,618,133 B2, and 6,630,993 B1 issued to Hedges et al., and those systems commercially-available from ARC Second, Inc. of Dulles, Va. Further embodiments of position reference systems may include sonar-based ultrasound systems, such as the type described, for example, in *High Resolution Maps from Wide Angle Sonar* by Moravec et al. of The Robotics Institute of Carengie-Mellon University, and laser-based point tracking systems of the type commercially-available from Automated Precision, Inc. of Rockville, Md., or any other suitable types of position-measuring systems.

With continued reference to FIG. 2, a reformatting module 214 is operatively coupled between the position reference system 120 and the control data network 240, and is configured to receive the position and motion data measured by the position reference system 120, to reformat these data as necessary, and to broadcast these data to various other components of the command and control architecture 200 via the control data network 240. It will be appreciated that the reformatting module 214 may be separate from the position reference system 120, as shown in FIG. 2, or alternately, may be incorporated within the position reference system 120. As described above, the position, attitude, and movement data provided by the position reference system 120 (and reformatted by the reformatting module 214) are used by the command and control architecture 200 in a closed-loop feedback manner by comparing the actual data with the desired or predicted data (e.g. using the real environment and dynamics functionality 210 (or a simulated environment and dynamics module 220 described below) and issuing appropriate control and stabilization commands (e.g. using the vehicle control modules 212) to controllably adjust (or maintain) one or more of the positions, attitudes, and movements of the test vehicles 110 accordingly.

In this embodiment, the command and control architecture 200 further includes a simulated environment and dynamics module 220 configured to perform computations and data management associated with one or more simulated vehicle modules 222. The simulated environment and dynamics module 220 may also reside on the command and control computer 102 as part of the command and control software 112. Each simulated vehicle module 222 operatively communicates with the control data network 240 and the health monitoring network 242. The simulated environment and dynamics module 220 is further configured to provide simulated position, attitude, and movement data associated with the simulated vehicles 222, as well as health management data associated with the simulated vehicles 222, to the reformatting module 214 for broadcast onto the control data network 240. Thus, the command and control architecture 200 may advantageously be used for developing test vehicles 110 operating in an environment having both real and simulated vehicle and environmental conditions.

One or more operators 224 may issue control commands to various components of the development system 100 via a command and control module 226 of the human interface 150, which operatively communicates with the control data network 240 and with the health monitoring network 242. For example, an operator 224A may transmit appropriate commands to a simulated vehicle module 222A to direct the movement, attitude, activity, or any other desired characteristic of the simulated vehicle module 222A via the control data network 240. In turn, the one or more operators 224 may monitor any desired characteristics of the development system 100 that may be of interest on a situational display module 228 of the human interface 150, including the positions, movements, and health characteristics of the simulated vehicle modules 222 and the test vehicles 110. For example, the operator 224A of the simulated vehicle module 222A may monitor desired characteristics (e.g. position, movement, health characteristics, etc.) on a simulated vehicle display portion 228A of the situational display software 228.

In the embodiment shown in FIG. 2, the command and control architecture 200 further includes a recharge station 230 operatively coupled to the control data and health monitoring networks 240, 242 by a recharge station control unit 232. The recharge station 230 is configured to provide replenishment of expendable resources to the test vehicles 110 based on the health monitoring information broadcast to the health monitoring network 242. A network manager module 234 is coupled to the control data and health monitoring networks 240, 242 and is configured to perform various conventional network management activities and functions. A recording module 236 is coupled to the control data and health monitoring networks 240, 242 and is configured to record the data broadcast on the control data and health monitoring networks 240, 242 during development tests for subsequent analyses. Playback functionality of recorded tests for post-test analysis and demonstration may be achieved using the control and health monitoring networks 240, 242 interface between the recording module 236 and the command and control module 226.

Figure 3:
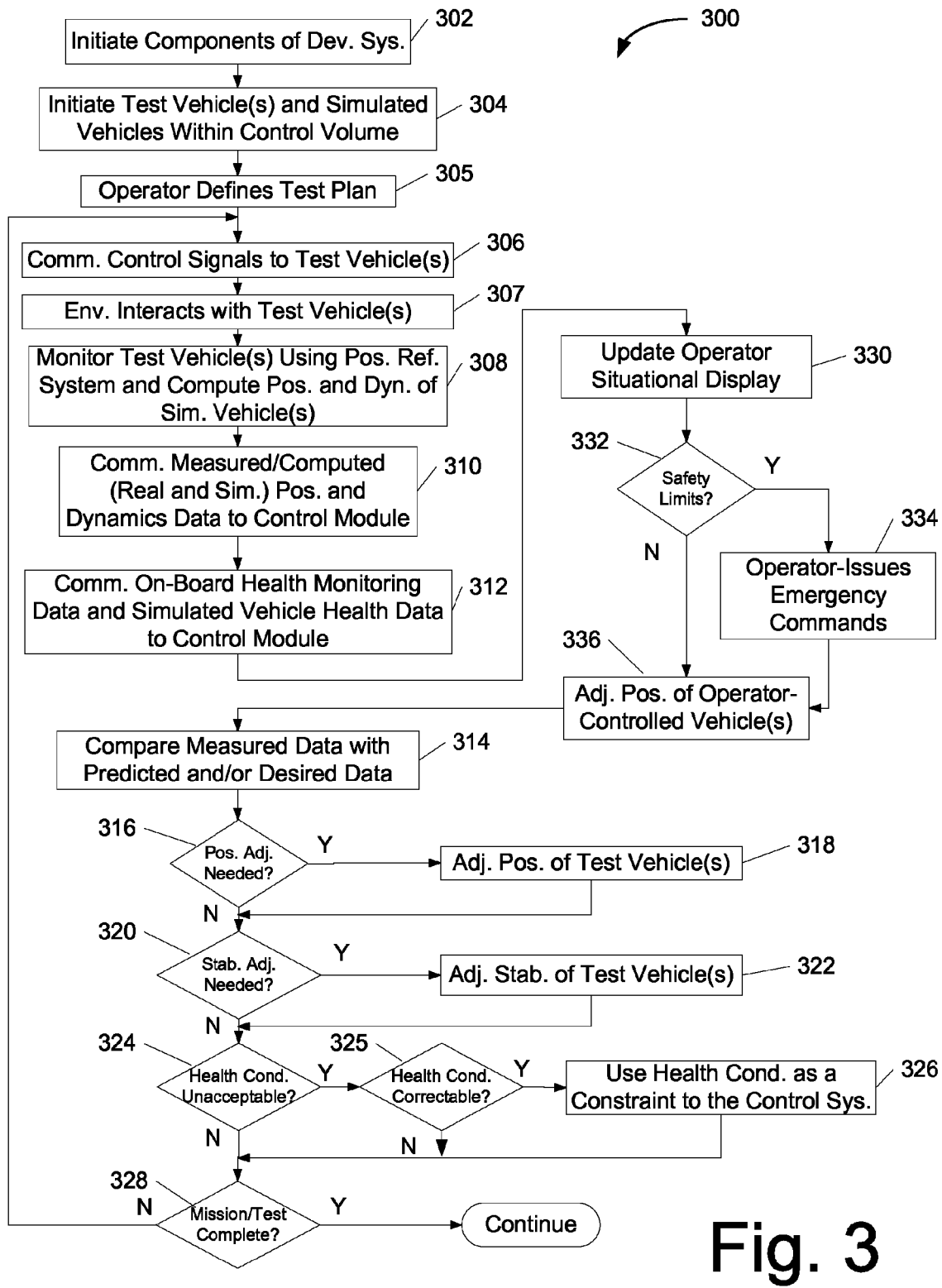
FIG. 3 is a flowchart of a control method corresponding to the command and control architecture of FIG. 2 in accordance with another exemplary embodiment of the invention.

FIG. 3 is a flowchart of a control method 300 corresponding to the command and control architecture 200 of FIG. 2 in accordance with another exemplary embodiment of the invention. In this embodiment, the various components of the development system 100 are initiated at a block 302, and one or more test vehicles 110 (and if applicable, simulated vehicles) within the control space 122 are initiated at a block 304. An operator-defined test plan is input at a block 305, and control signals are communicated to the test vehicles 110 at a block 306. For example, in some embodiments, the command and control computer 102 may cause the vehicle control units 212 to transmit appropriate command signals 108 to the test vehicles 110, directing the test vehicles 110 to perform desired activities or functions. The command and control computer 102 may determine the appropriate command signals based on, for example, one or more control algorithms or software routines installed within the command and control software 112.

At a block 308, the position reference system 120 monitors the positions and movements of the test vehicles 110, and if applicable, the positions and dynamics of the simulated vehicles are also calculated. The position and dynamics data measured by the position reference system 120 (and computed for the simulated vehicles) are communicated to the command and control computer 102 at a block 310. In preferred embodiments, the position reference system 120 is capable of measuring each of the six degrees of freedom that define the position and movement of each test vehicle 110, however, in alternate embodiments, the position reference system 120 may suitably measure fewer than six degrees of freedom. Similarly, at a block 312, health monitoring data collected by sensors located on board each of the test vehicles 110, and if applicable, the simulated vehicle health data, are communicated to the command and control computer 102.

In the embodiment shown in FIG. 3, the control method 300 includes an update of the operator's situational display at a block 330. At a block 332, a determination (or series of determinations) is made to determine whether one or more of the test vehicles 110 and simulated vehicles are approaching or crossing safety limits. If so, the operator may issue appropriate control commands at a block 334 to correct the position or course of the one or more vehicles as needed, and the position and course of the one or more vehicles may be adjusted accordingly at a block 336.

As further shown in FIG. 3, the position and dynamics data measured by the position reference system 120, and health monitoring data transmitted by the onboard sensors, are compared with predicted and desired data values at a block 314. For example, the measured positions, attitudes, and velocities of the test vehicles 110 may be compared with desired values based on a pre-programmed mission profile stored within the command-and-control computer 102. Similarly, vehicle health data, such as battery charge levels, fuel levels, pressure and temperature levels, weapons status, other expendable resource levels, and any other desired health parameters may be compared with anticipated or desired values based on the pre-programmed mission profile.

Based on the comparisons performed at the block 314, a determination (or series of determinations) is made at a block 316 to determine whether a position adjustment of one or more of the test vehicles 110 is needed. If so, the position adjustment of the one or more test vehicles 110 is performed at a block 318. For example, the command and control computer 102 may cause appropriate position control commands to issue from the corresponding vehicle control units 212 to controllably adjust the position of the one more test vehicles 110.

Similarly, at a block 320, a determination (or series of determinations) is made to determine whether a stabilization adjustment of one or more of the test vehicles 110 is needed. If so, adjustment of the appropriate stabilization parameters of the one or more test vehicles 110 is accomplished at a block 322. Prior art for stabilization adjustment typically requires the use of sensors, such as rate gyros and accelerometers, on-board the test vehicles 110 to provide data for stabilization. In the current embodiment, the position reference system 420 provides data for the stabilization adjustment with sufficiently high accuracy and low latency to significantly reduce or eliminate the requirements for these sensors. The further benefit is the reduction in test vehicle weight associated with the requirement of carrying these sensors.

Next, at a block 324, a determination (or series of determinations) is made to determine whether health conditions of the one or more test vehicles 110 are unacceptable. If so, a determination is made at a block 325 to determine whether the unacceptable health condition is correctable. If so, then corrective action may be taken to adjust the efficient health conditions of the one more test vehicles 110 at a block 326, including using the health condition as a constraint in the control commands of the corresponding vehicle(s). If the health conditions of the vehicles are not unacceptable, or if any unacceptable conditions are not correctable, then at a block 328, a determination is made regarding whether the test or mission is complete. If not, the method 300 returns to block 306 and the above-described actions are repeated. Otherwise, the method 300 is complete.

It will be appreciated that the various steps shown in FIG. 3, where not expressly stated, apply equally to the simulated vehicles. The application to broadcast the position and attitude data 214 may combine the data from the real and simulated environments such that the individual vehicles, whether real or simulated, do not know the origin and are able to react to the other vehicles and to the provided data in a common manner. The simulated environment and dynamics 220 provides simulated health data to be used in the evaluation at block 324 and for stabilization and position adjustment of the vehicles 316, 320. The simulated data may be based upon models developed to emulate the real vehicles and may include deterministic and random behaviors in an effort to best reflect the uncertain real environment.

Figure 4:
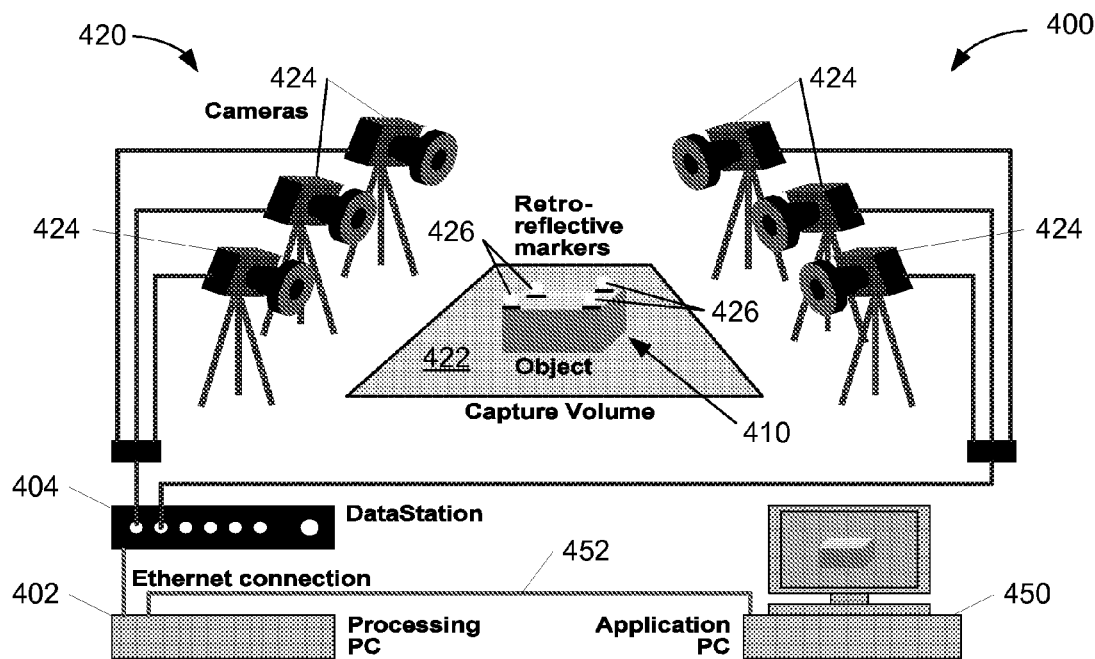
FIG. 4 is a schematic view of a development system in accordance with an alternate embodiment of the invention.

FIG. 4 is a schematic view of a development system 400 in accordance with an alternate embodiment of the invention. In this embodiment, the development system 400 includes a main processing computer 402 operatively coupled to a position reference system 420 via a data station 404, into an application computer 450 via a datalink 452 (e.g. an Ethernet connection). A remotely-controlled test vehicle 410 is positioned within a control (or capture) volume 422 monitored by the position reference system 420.

The position reference system 420 includes a plurality of motion capture devices 424 (e.g. cameras) operatively distributed about the control volume 422 and configured to monitor the positions and movements of a plurality of retro-reflective markers 426 disposed on the test vehicle 410. In the embodiment shown in FIG. 4, the motion capture devices 424 operate in the visible portion of the spectrum, however, in alternate embodiments, devices that operate in other portions of the spectrum (e.g. near infrared, infrared, etc.) may be used. The motion capture devices 424 are configured to monitor the retro-reflective markers 426 and to export the positions of the retro-reflective markers 426 to the main processing computer 402 in real-time. Alternately, using a priori knowledge of the relative positions of the retro-reflective markers 426 on the test vehicle 410, the motion capture devices 424 may internally process the measured marker position data to derive position and orientation data of the grouping of markers representing the test vehicle 410, and may output the position and orientation data of the test vehicle 410 to the main processing computer 402.

In one particular embodiment, a total of six motion capture devices 424 are distributed about an approximately room-sized control volume 422 (e.g. 25'×25'×8') and are configured to provide sub-millimeter position accuracy of the positions of the retro-reflective markers 426 at refresh rates of up to 500 Hz with 10 ms processing latency. Thus, the position reference system 420 may provide six degree of freedom motion tracking of the test vehicle 410 in approximately real-time to enable closed-loop feedback control of the position, movement, and stabilization characteristics of the test vehicle 410. In alternate embodiments, any suitable number of motion capture devices 424 (e.g. two or more) may be used, and the control volume 422 may be scaled up or down to any desired size. For example, in another particular embodiment, eight motion capture devices 424 are used. Similarly, in alternate embodiments, the motion capture devices 424 may be configured to provide any suitable or desired resolution and operational frequency. Suitable motion capture devices 424 that may be used in the position reference system 420 include those camera systems commercially-available from Vicon Limited of Oxford, UK, as well as camera systems commercially-available from Motion Analysis Corp. of Santa Rosa, Calif. Additional embodiments and operational aspects of suitable position reference systems are described in the above-referenced, commonly-owned U.S. patent application No. Ser. No. 11/459,631 entitled "Closed-Loop Feedback Control of Vehicles Using Motion Capture Systems" filed concurrently herewith on Jul. 24, 2006, previously-incorporated herein by reference.

Figure 5:
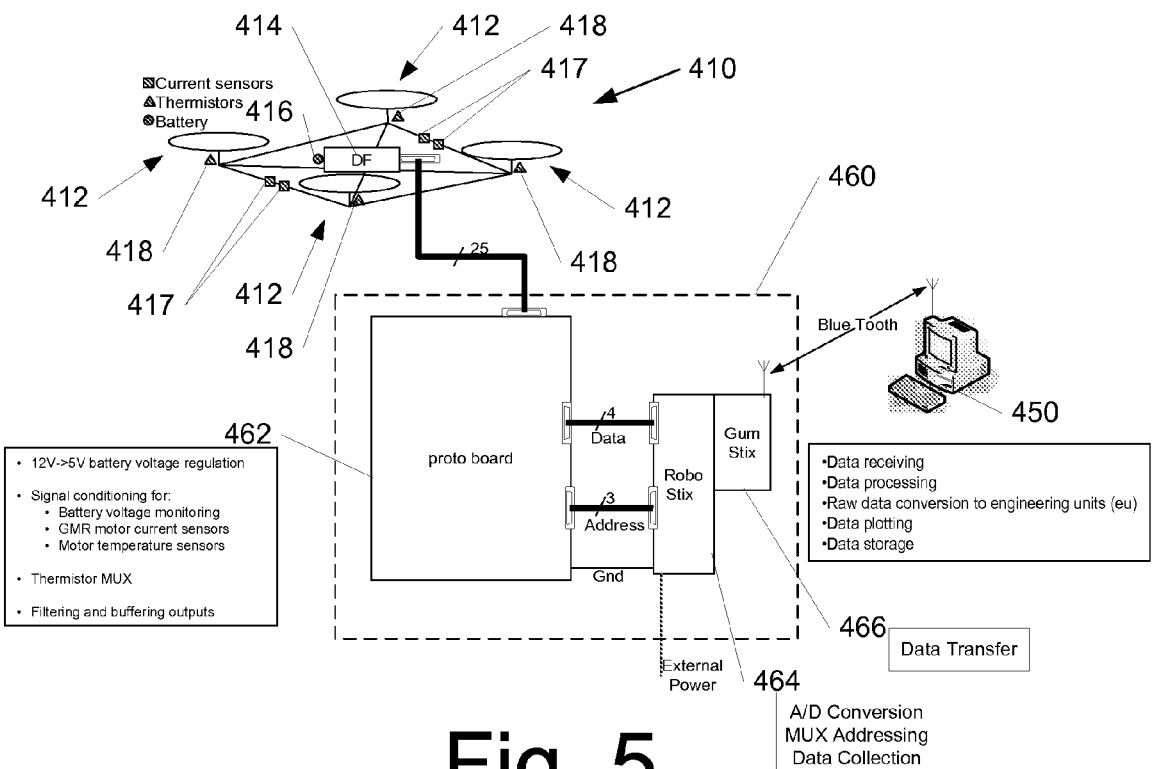
FIG. 5 is an enlarged schematic view of a test vehicle of the development system of FIG. 4.
Figure 6:
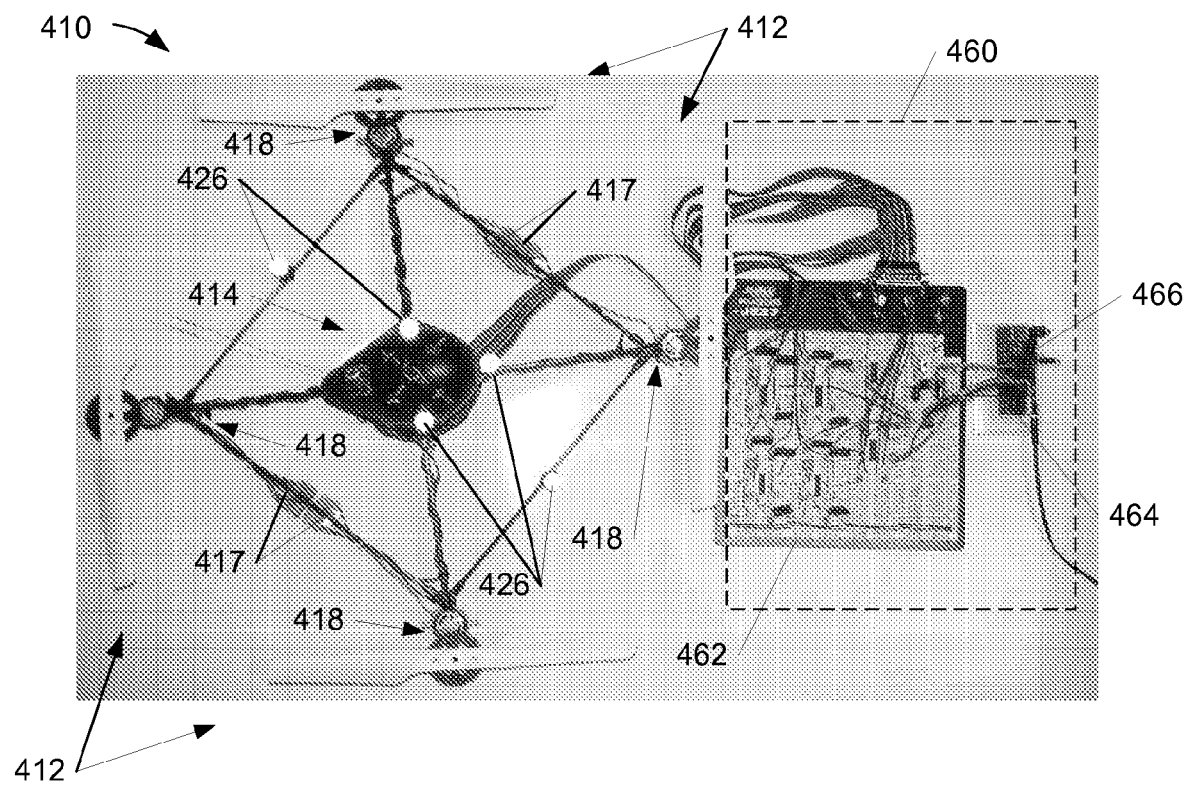
FIG. 6 is an plan view of the test vehicle and a health monitoring control board of the development system of FIG. 4.
Figure 7:
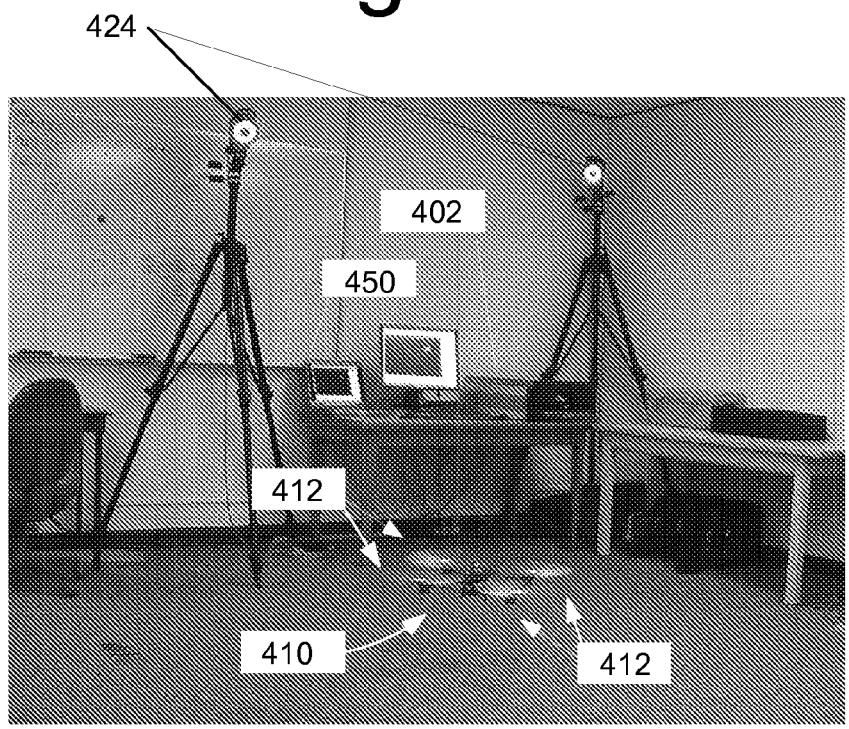
FIG. 7 is a partial view of the development system of FIG. 4 in operation with the flight vehicle.

FIGS. 5 and 6 are enlarged schematic and plan views, respectively, of the test vehicle 410 in association with other components of the development system 400. FIG. 7 shows the test vehicle 410 in operation within the control volume 422 of the development system 400. As best shown in FIG. 5, in this embodiment, the test vehicle 410 includes an onboard controller 414 operatively coupled to a plurality of rotor assemblies 412 and to a power source 416 (e.g. a battery). A current sensor 417 monitors an electrical current drawn by each rotor assembly 412, and a thermistor 418 monitors a temperature of each rotor assembly 412. In a particular embodiment, the test vehicle 410 is a modified version of a Draganflyer RC helicopter commercially available from Draganfly Innovations, Inc. of Saskatoon, Saskatchewan.

The onboard controller 414 is operatively coupled to a control module 460. The control module 460 may be located on the test vehicle 410, or alternately, may be positioned remotely from the test vehicle 410 and may communicate with the onboard controller 414 via a wireless communication link. In the embodiment shown in FIG. 5, the control module 460 includes a health management component 462 coupled to a processing component 464 that is, in turn, coupled to a communication component 466. The processing and communication components 464, 466 may have somewhat overlapping functions and capabilities. For example, in a particular embodiment, the processing component 464 may perform data collection and relatively low-level onboard processing activities, while the communication component 466 may perform relatively high-level onboard processing activities as well as communication activities. The health management and/or processing components 462, 464 are adapted to monitor the voltage level of the power source 416, the outputs of the current sensors 417 and temperature sensors 418, and to buffer, filter, and condition the signals received from the test vehicle 410 for communication to the communication component 466. In turn, the communication component 466 is configured to transmit these data to a command and control component of the development system 400 to enable health monitoring of the various systems and parameters of the test vehicle 410. In a particular embodiment, the processing component 464 may be a Robostix microcontroller and the communication component 466 may be a Connex 400xm-bt platform, both of which are commercially available from gumstix inc. of Portola Valley, Calif. In another embodiment, a microcontroller (e.g. a Robostix microcontroller) may be combined with a printed circuit board to provide these functions onboard the test vehicle 410, as described below with reference to FIGS. 13 and 14.

Figure 8:
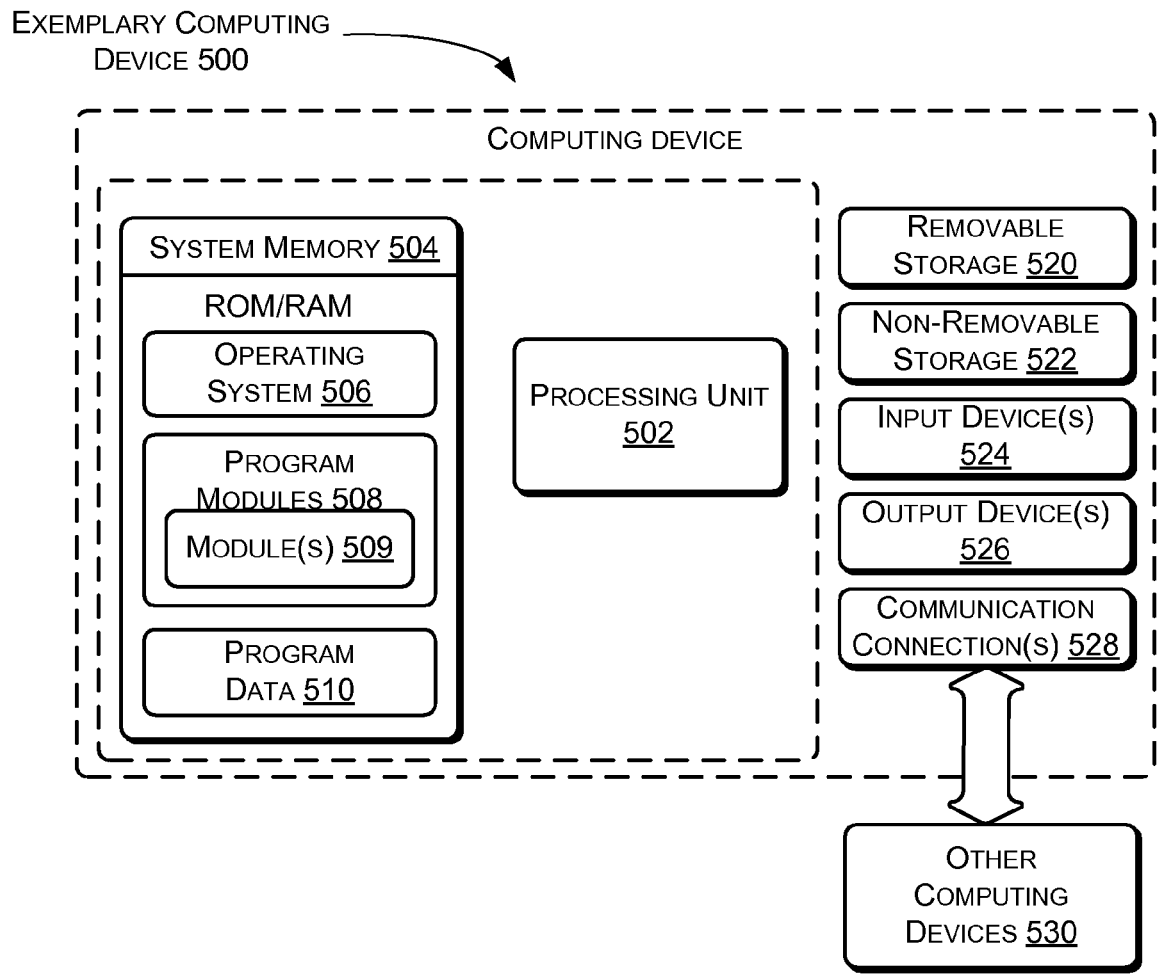
FIG. 8 is a schematic view of a computer system of the development system of FIG. 4.

FIG. 8 is a schematic view of a computer device 500 suitable for use with the development system 400 of FIG. 4. More specifically, the computer device 500 may be used as the main processing computer 402, or as the application computer 450, or both. In a very basic configuration, the computing device 500 includes at least one processing unit 502 and system memory 504. Depending on the exact configuration and type of computing device 500, the system memory 504 may be volatile (such as RAM), non-volatile (such as ROM and flash memory) or some combination of the two. The system memory 504 typically includes an operating system 506, one or more program modules 508, and may include program data 510.

For methods and systems in accordance with the present disclosure, the program modules 508 may include the process modules 509 that realize one or more the processes described herein. Other modules described herein may also be part of the program modules 508. As an alternative, process modules 509, as well as the other modules, may be implemented as part of the operating system 506, or it may be installed on the computing device and stored in other memory (e.g., non-removable storage 522) separate from the system memory 506.

The computing device 500 may have additional features or functionality. For example, the computing device 500 may also include additional data storage devices (removable and/or non-removable) such as, for example, magnetic disks, optical disks, or tape. Such additional storage is illustrated in FIG. 8 by removable storage 520 and non-removable storage 522. Computer storage media may include volatile and non-volatile, removable and non-removable media implemented in any method or technology for storage of information, such as computer readable instructions, data structures, program modules, or other data. The system memory 506, removable storage 520 and non-removable storage 522 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of the device 500. Computing device 500 may also have input device(s) 524 such as keyboard, mouse, pen, voice input device, and touch input devices. Output device(s) 526 such as a display, speakers, and printer, may also be included. These devices are well know in the art and need not be discussed at length.

The computing device 500 may also contain a communication connection 528 that allow the device to communicate with other computing devices 530, such as over a network. Communication connection(s) 528 is one example of communication media. Communication media may typically be embodied by computer readable instructions, data structures, program modules, or other data in a modulated data signal, such as a carrier wave or other transport mechanism, and includes any information delivery media.

Various modules and techniques may be described herein in the general context of computer-executable instructions, such as program modules, executed by one or more computers or other devices. Generally, program modules include routines, programs, objects, components, data structures, and so forth for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Figure 9:
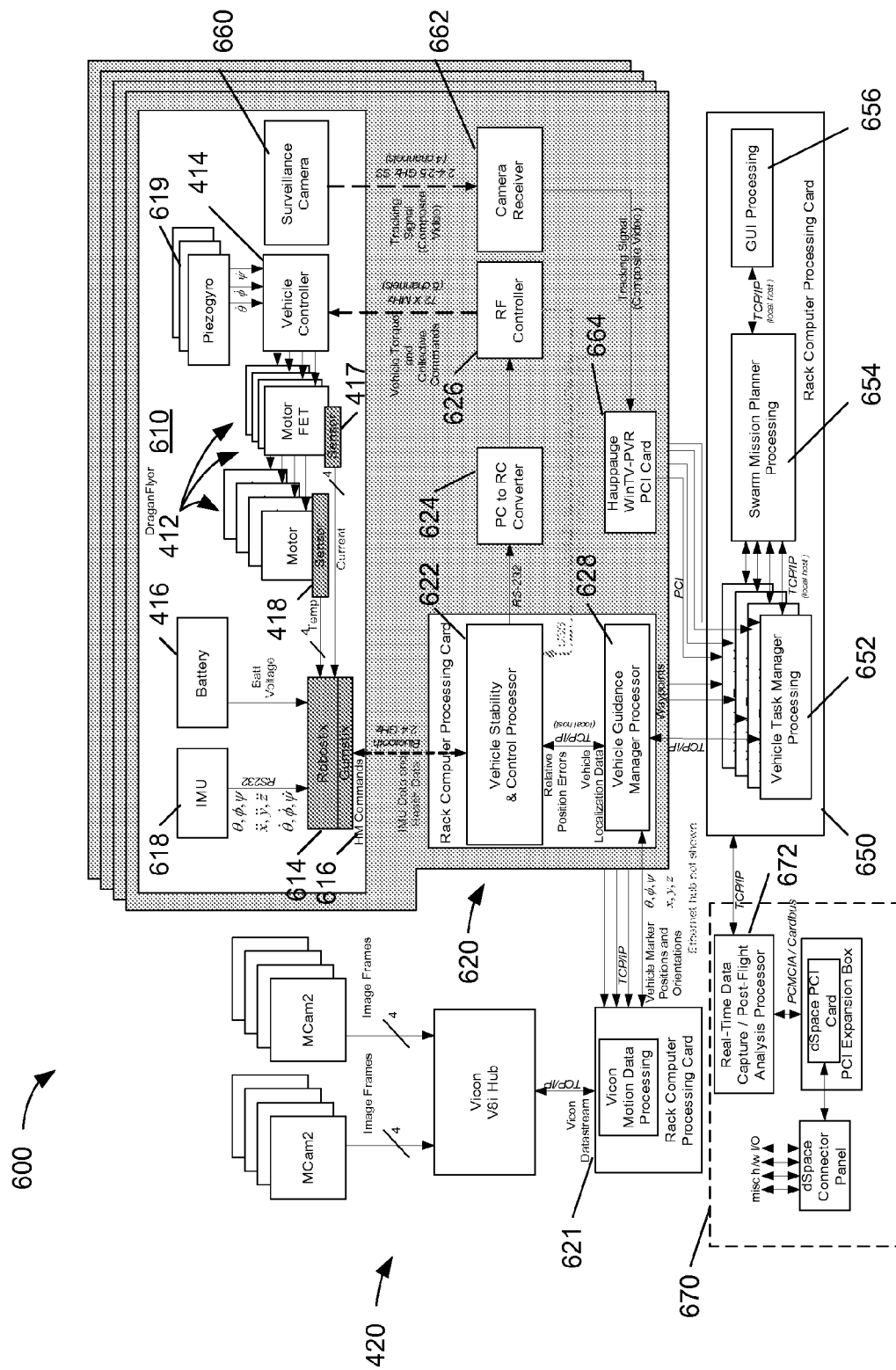
FIG. 9 is a schematic overview of a health monitoring system of the development system of FIG. 4.

FIG. 9 is a schematic overview of a health monitoring system 600 of a development system in accordance with an alternate embodiment of the invention. In this embodiment, the test vehicle 610 includes a vehicle controller 414, a power source 416, rotor assemblies 412, and current and temperature sensors 417, 418 as described above (FIG. 5). The test vehicle 610 also includes a processing component 614 and communication component 616. The processing component 614 receives health monitoring data from the various components on board the test vehicle 610, including the sensors 417, 418, an inertial measurement unit (IMU) 618, one or more piezogyros 619, or any other desired components of the test vehicle 610. The processing component 614 may filter, condition, and buffer the health monitoring data before transmitting it to the communication component 616, which then transmits the monitoring data to a command and control component 620. As noted above, the processing and communication components 464, 466 may have somewhat overlapping functions and capabilities, such as using the processing component 464 to perform data collection and relatively low-level onboard processing activities, and the communication component 466 to perform relatively high-level onboard processing activities. In some embodiments, for example, the processing component 614 (or component 616) may use Kalman filtering or other algorithms to monitor for a functional health degradation of an onboard sensor, such as a piezogyro or other stability or navigational device.

The command and control component 620 may reside in any suitable location within the development system, including, for example, on the main processing computer 402 or on the application computer 450 (FIG. 4). The command and control component 620 may reside on a single component or portion of the development system, or may be distributed across various components. As shown in FIG. 9, in this embodiment, the command and control component 620 includes a stability and control processor 622 that receives the vehicle information transmitted by the onboard communication component 616.

As further shown in FIG. 9, the stability and control processor 622 transmits at least a portion of the received vehicle information to a guidance manager processor 628. Similarly, the position reference system 420 captures motion information of the test vehicle 610 within the control volume 422, processes this information using a motion data processing component 621, and transmits the motion data (e.g. vehicle or marker positions and orientations) to the guidance manager processor 628. The guidance manager processor 628 communicates the motion data and vehicle information to a rack computer processing card 650. In a particular embodiment, the rack computer processing card 650 is the part of the main processing computer 402 (FIG. 4).

A surveillance camera 660 may be disposed on the test vehicle 610 and may transmit image data (e.g. composite video images) to a camera receiver 662 of the command and control component 620. The image data are then transmitted to a PCI card 664, which outputs the image data to the rack computer processing card 650.

In the embodiment shown in FIG. 9, the rack computer processing card 650 includes a vehicle task manager processing component 652, a mission planner processing component 654, and a GUI processing component 656. The mission planner processing component 654 is used to assign a high-level mission to the test vehicle(s) 410 based on human user input provided via the GUI processing component 656. Examples of such "missions" include providing reconnaissance, surveillance, or target acquisition (commonly known as RSTA) within the entire or a specific sub-volume of the control volume 422 and/or for another object or test vehicle 410 (or groups of test vehicles). The vehicle task manager processing component 652 is used to assign specific actions to individual or groups of vehicles in order to accomplish the higher-level mission objective. Examples of such tasks include one or a sequence of the following actions or behaviors: move to a specific target position (i.e. waypoint), point directional sensor(s), return to base, emergency land, activate/deactivate surveillance sensor(s), provide telemetry of specified data, manipulate robotic effector(s) (if test vehicle 410 is equipped with such), perform coordinated flight of a group of test vehicles (e.g. flocking). The GUI processing component 656 provides human users access to test vehicle telemetry (e.g. surveillance camera 660 video images), allows the human user to assign missions and monitor the effectiveness of the test vehicle(s) 410 for a defined mission, and enables the human user to remain "in the loop" to issue time- and/or safety-critical commands.

In operation, the rack computer processing card 650, the stability and control processor 622, and the vehicle guidance manager processor 628, analyze the vehicle information received from the test vehicle 610, as well as the motion data received from the position reference system 420 and the image data received from surveillance camera 660, to determine appropriate stability and control signals necessary to control the test vehicle 610. These stability and control signals are transmitted by the stability and control processor 622 through a PC-to-RC (personal computer to remote controller) converter 624 to a remote control unit 626. The remote control unit 626 transmits corresponding control signals to the onboard vehicle controller 414 which, in turn, communicates appropriate command signals to the various components of the test vehicle 610 (e.g. rotor assemblies 412, etc.) to maintain the desired position, velocity, direction, attitude, and stabilization of the test vehicle 610.

With continued reference to FIG. 9, the rack computer processing card 650 is operatively coupled to an analysis and display component 670 (e.g. the application computer 450 of FIG. 4, or the human interface 150 of FIG. 1) that includes a data capture and analysis component 672. The data capture and analysis component 672 receives the vehicle information, motion capture data, and image data from the rack processing card 650 for real-time analysis and display, or subsequent post-processing.

The components 670, 672 may be a real-time hardware-in-the-loop rapid prototyping tool using, for example, the dSPACE real-time hardware-in-the-loop rapid prototyping system available from dSPACE, Inc. of Novi, Mich., the North American subsidiary of dSPACE GmbH, Germany. Here, vehicle and system information with various sensor feedback signals from the vehicle and system as well as command and control signals are collected via an interface connector panel. The connector panel sends the signals to the real-time processing board where they get sampled and digitized for digital signal processing. The board may further interface with the software/PC application in real-time. A custom-developed rapid-prototyping tool may provide combined real-time data capture, presentation, in-flight and post-flight data analysis and rapid vehicle subsystem/system characterization and tuning. This enables rapid prototyping and characterization of subsystem and system components and related algorithms. As an example, the motor/rotor dynamics have been rapidly characterized and analyzed using this component. A summary of the rapid characterization results are captured in FIG. 12 below.

Figure 10:
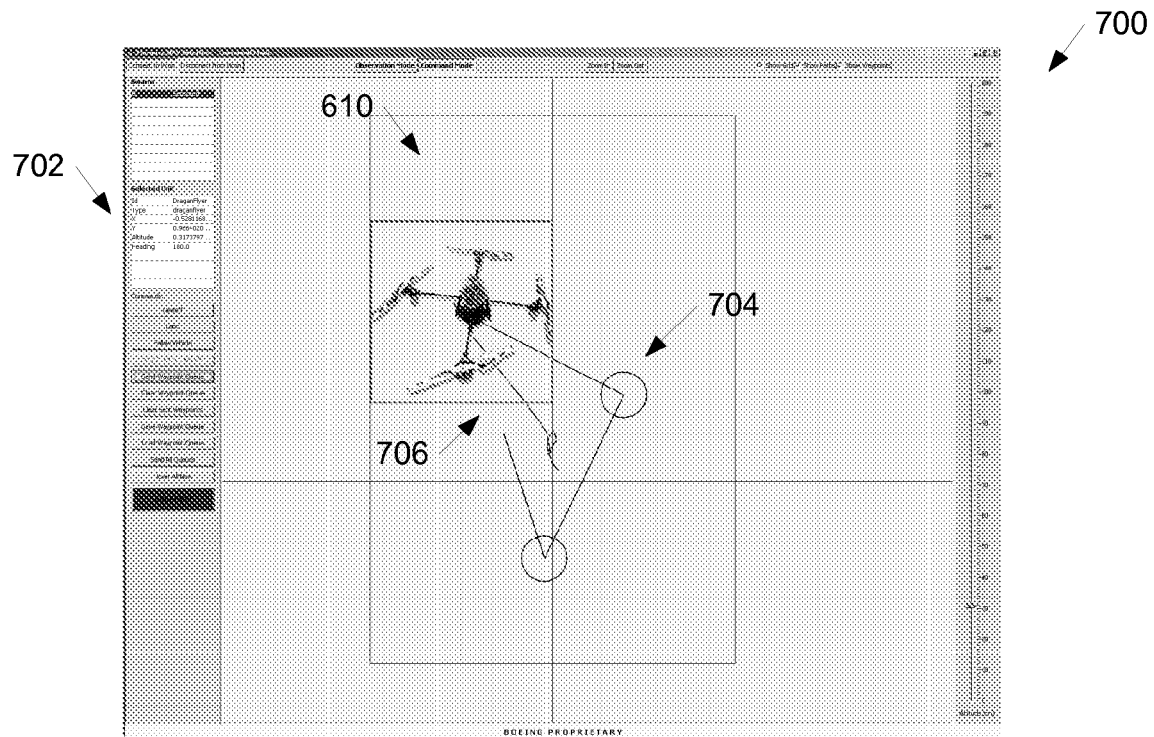
FIGS. 10 through 12 are representative screenshots provided by an analysis and display component of FIG. 9.
Figure 11:
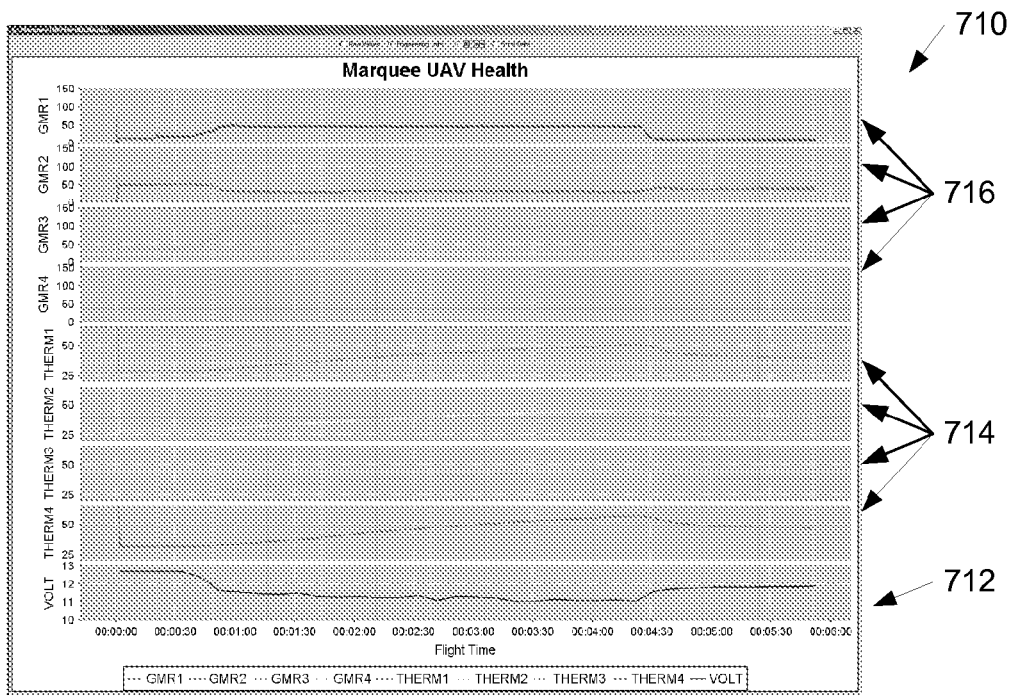
Figure 12:
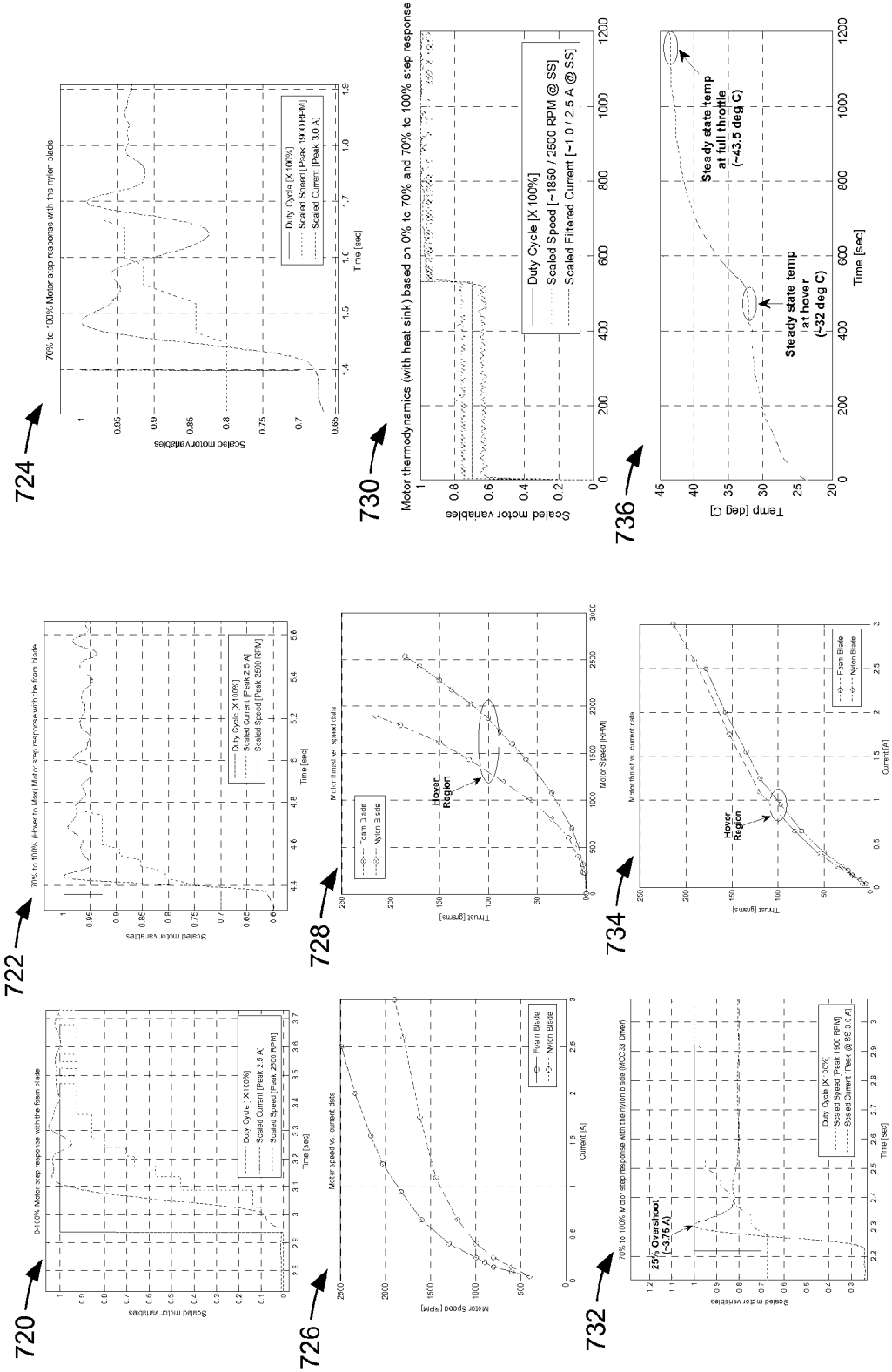

FIGS. 10 through 12 are representative screenshots provided by the analysis and display component 670 of FIG. 9. More specifically, FIG. 10 shows a screen display 700 depicting the position and attitude of the test vehicle 610. A portion 702 of the screen display 700 provides digital values of the positions, attitudes and headings of the test vehicle 610. A first trace 704 is plotted to show a desired mission profile of the test vehicle 610, and a second trace 706 is plotted to show the actual mission profile followed by the test vehicle 610. Thus, the analysis and display component 670 can provide a real time visual representation of the test vehicle 610 as well as a qualitative assessment of a performance of a component under test (e.g. a control algorithm).

FIG. 11 shows a screen display 710 depicting graphs of health monitoring information for the test vehicle 610 during flight testing. A first graph 712 shows a plot of power source voltage versus flight time. Second graphs 714 show plots of the temperatures at the rotor assemblies 412 as measured by the temperature sensors 418, and third graphs 716 show plots of the rotor assemblies 412 as measured by the current sensors 417. In this way, the analysis and display component 670 may provide real-time information regarding important health characteristics of the test vehicle 610 during flight testing, which may advantageously improve test quality and reduce failures and associated downtime.

FIG. 12 shows numerous graphs of various test parameters that may be monitored, controlled, and displayed using the analysis and display component 670 during vehicle development tests using embodiments of the present invention. More specifically, first and second graphs 720, 722 show plots of scaled motor speed and current time responses to a motor pulse-width modulation command duty cycle step input change for a rotor assembly having a foam blade, enabling the motor step response characteristics to be evaluated. A third graph 724 shows similar data as 722 but for a rotor assembly having a nylon blade. A fourth graph 726 shows a plot of motor speed versus input current for both the foam blade and the nylon blade, enabling an evaluation of the impact of differing blade materials on motor speed performance. Similarly, fifth and eighth graphs 728, 734 show plots of thrust versus motor speed for both the foam blade and the nylon blade, enabling an evaluation of the impact of differing blade materials on thrust performance. A sixth graph 730 (when analyzed with a ninth graph 736) enables an assessment to be made of the motor thermodynamic characteristics by showing a plot of scaled digitally-filtered motor speed and current responses to a duty cycle step input of a motor along with a corresponding plot of temperature versus time, enabling an assessment of the temperature characteristics of the rotor assembly 412 during a particular test flight or mission profile. A seventh graph 732 shows a plot of scaled motor speed and current responses of a motor using nylon blades for an alternate motor driver circuit, allowing motor driver circuit design changes to be evaluated. Of course, a wide variety of other graphs of various test parameters of interest during vehicle development tests may be monitored, controlled, and displayed using the analysis and display component 670.

Figure 13:
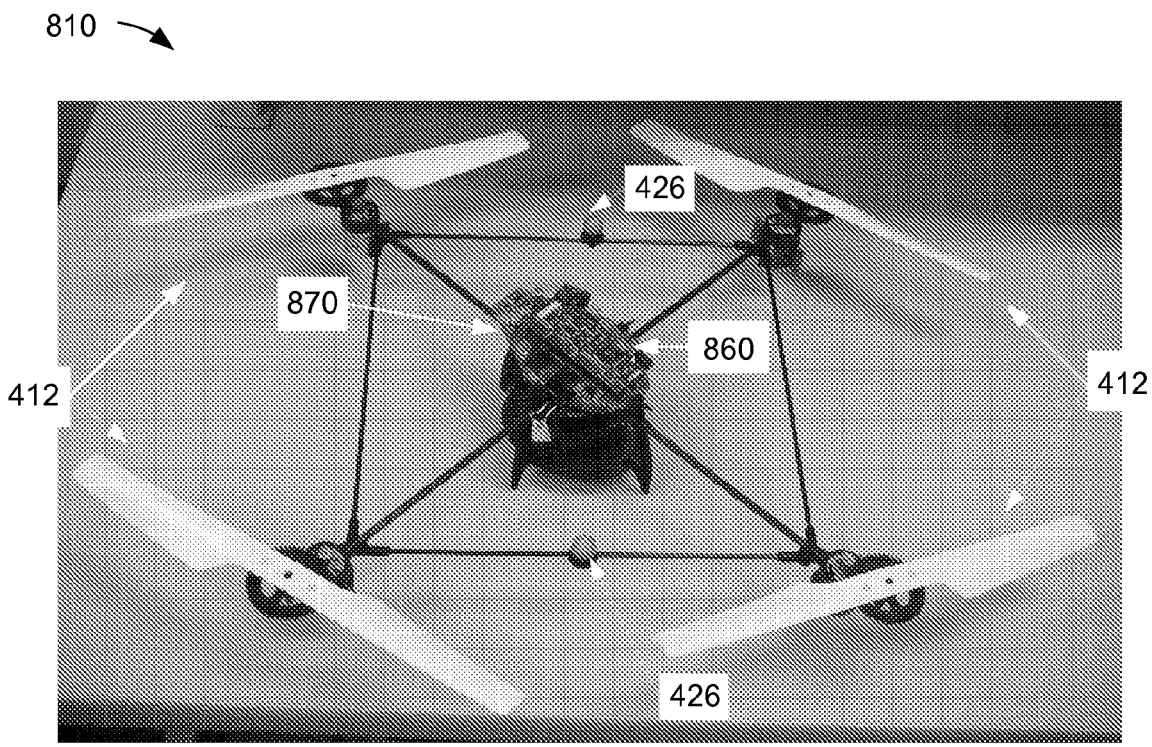
FIG. 13 is an isometric view of a test vehicle with an integrated health monitoring control board and processing component in accordance with another embodiment of the invention.
Figure 14:
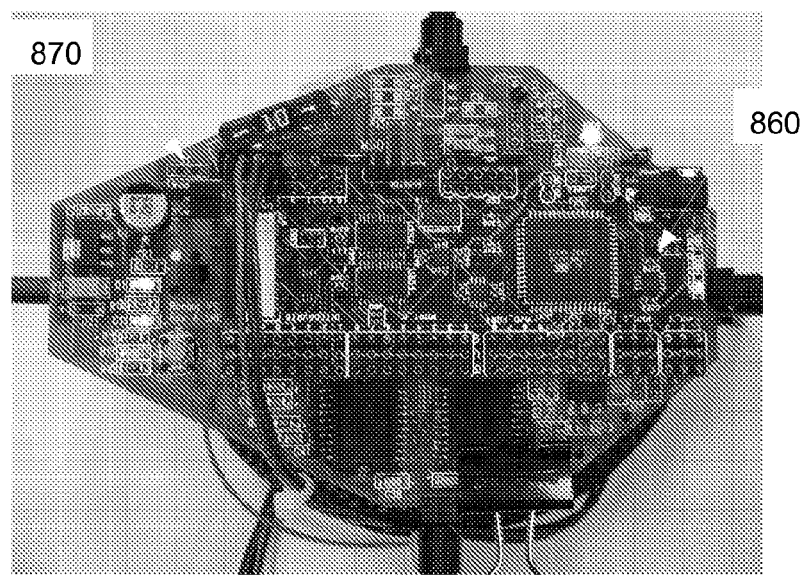
FIG. 14 is an enlarged elevational view of the health monitoring control board and processing component of FIG. 13.

FIG. 13 is an isometric view of a test vehicle 810 in accordance with another embodiment of the invention. In this embodiment, the test vehicle 810 includes a health monitoring control board 860 miniaturized on a processing component (or printed circuit board, or PCB) 870. FIG. 14 is an enlarged elevational view of the health monitoring control board 860 and the processing component 870 of the test vehicle 810 of FIG. 13. The processing component 870 includes various sensors (e.g. current sensors, temperature sensors, sensors, etc.) as well as the communication component (e.g. the above-referenced Connex component by gumstix, inc.), and associated circuitry for driving the rotor assemblies 412, and provides the above-described capabilities in a highly-integrated module that is both light weight and highly serviceable. Thus, the processing component 870 and health monitoring control board 860 may be positioned on each of the vehicles 810 of a development system, and may receive the one or more stability and control characteristics determined by the position reference system from a communication network, may compute the corresponding command signals in a distributed (rather than centralized) fashion, and may communicate the command signals to the onboard control system of each of the vehicles in a closed-loop feedback manner.

From the foregoing description, it may be appreciated that embodiments of systems and methods in accordance with the present invention may advantageously enable rapid development and testing of a wide variety of vehicles and vehicle components (hardware and software) in a controlled environment. Vehicle components, such as new software systems, avionics systems, control algorithms, computer hardware components, sensors, flight vehicle components and configurations, and other suitable parameters of interest may be quickly and repeatedly tested using development systems and methods in conjunction with one or multiple test vehicles. Embodiments of the present invention may be scaled to fit within a suitable laboratory environment, enabling testing and development of new vehicles and vehicle components to be performed rapidly, efficiently, and cost effectively.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A system for operating one or more vehicles, comprising:
   a position reference system including a plurality of cameras operatively disposed along at least a portion of a perimeter of a control volume, the position reference system being configured to repetitively measure one or more stability and control characteristics of the one or more vehicles at least in part using the plurality of cameras as the one or more vehicles operate within the control volume;
   a control architecture configured to receive the repetitively measured one or more stability and control characteristics from the position reference system, to determine corresponding command signals based on the repetitively measured one or more stability and control characteristics from the position reference system, and to transmit the corresponding command signals to the one or more vehicles operating within the control volume to control the one or more stability and control characteristics of the one or more vehicles in a closed-loop system; and
   a simulation component configured to simulate one or more simulated vehicles via the control architecture, and to determine the corresponding command signals based at least in part on a simulated characteristic of the one or more simulated vehicles.

2. The system of claim 1, wherein the control architecture includes a health monitoring component configured to receive health monitoring information from the one or more vehicles, and to assess a health condition of the one or more vehicles based on the received health monitoring information, the control architecture being further configured to determine the corresponding command signals based at least partially on the health monitoring information of the one or more vehicles.

3. The system of claim 2, wherein the health monitoring information includes at least one of a characteristic of an onboard vehicle propulsion system, a characteristic of an onboard power system, and a functional degradation of an onboard sensor system.

4. The system of claim 3, wherein at least one of the vehicles includes a flight vehicle, and wherein the onboard vehicle propulsion system comprises one or more rotor assemblies configured to provide lift for the flight vehicle.

5. The system of claim 1, wherein the control architecture includes:
at least one communication network operatively coupled to the position reference system;
a main processing component operatively coupled to the at least one communication network and configured to compute the command signals; and
one or more control modules operatively coupled to the at least one communication network and configured to receive the command signals from the main processing component, to recondition the command signals into a format suitable for use by the one or more vehicles, and to transmit the reconditioned command signals to the one or more vehicles.

6. The system of claim 1, wherein the control architecture includes:
at least one communication network operatively coupled to the position reference system and configured to transmit the one or more stability and control characteristics repetitively measured by the position reference system; and
an onboard processing component positioned on each of the vehicles and configured to receive the one or more stability and control characteristics from the at least one communication network, the onboard processing component being further configured to compute the command signals and to communicate the command signals to an onboard control system of each of the vehicles.

7. The system of claim 6, wherein the onboard processing component further includes a health monitoring component configured to receive health monitoring information regarding an associated one of the vehicles, the onboard processing component being further configured to determine the corresponding command signals based at least partially on the health monitoring information of the associated one of the vehicles.

8. The system of claim 1, wherein the simulation component is configured to determine interoperability of the one or more simulated vehicles with respect to the one or more vehicles operating within the control volume to enable testing of new prototypes before deployment of a physical vehicle.

9. The system of claim 1, wherein at least one of the vehicles and simulated vehicles includes at least one of a flight vehicle and a ground-based vehicle.

10. The system of claim 1, wherein the simulated characteristic of the one or more simulated vehicles includes at least one of a simulated position characteristic, a simulated attitude characteristic, a simulated stability characteristic, a simulated dynamic characteristic, and a simulated health condition characteristic.

11. The system of claim 1, wherein the plurality of cameras are configured to determine six-degree-of-freedom information for each of the vehicles operating within the control volume.

12. The system of claim 1, wherein each of the one or more vehicles has a plurality of retro-reflective markers positioned thereon, and wherein the plurality of cameras are configured to detect at least some of the retro-reflective markers positioned on the one or more test vehicles.

13. The system of claim 12, wherein the plurality of cameras are configured to track the retro-reflective markers using a visible wavelength portion of the spectrum.

14. The system of claim 12, wherein the plurality of cameras are configured to track the retro-reflective markers using an infrared wavelength portion of the spectrum.

15. A system for operating one or more vehicles, comprising:
a position reference system including a plurality of cameras operatively disposed with respect to a control volume, the position reference system being configured to repetitively measure one or more stability and control characteristics of the one or more vehicles at least in part using the plurality of cameras as the one or more vehicles operate within the control volume;
a health monitoring component configured to receive health monitoring information from the one or more vehicles, and to assess a health condition of the one or more vehicles based on the received health monitoring information;
a communication component configured to receive the repetitively measured one or more stability and control characteristics from the position reference system and the health monitoring information from the health monitoring component; and
a processing component operatively coupled to the communication component and configured to determine corresponding command signals based on the repetitively measured one or more stability and control characteristics and the health monitoring information, the communication component being further configured to transmit the corresponding command signals to the one or more vehicles to control the one or more stability and control characteristics in a closed-loop system.

16. The system of claim 15, wherein the health monitoring information includes at least one of a characteristic of an onboard vehicle propulsion system, a characteristic of an onboard power system, and a functional degradation of an onboard sensor system.

17. The system of claim 15, wherein the communication component includes:
at least one communication network operatively coupled to the position reference system; and
one or more control modules operatively coupled to the at least one communication network and configured to receive the command signals from the processing component, to recondition the command signals into a format suitable for use by the one or more vehicles, and to transmit the reconditioned command signals to the one or more vehicles.

18. The system of claim 15, wherein:
the communication component includes at least one communication network operatively coupled to the position reference system and configured to transmit the one or more stability and control characteristics repetitively measured by the position reference system; and the processing component includes one or more onboard processing components, each processing component being positioned on an associated one of the vehicles and configured to receive the one or more stability and control characteristics from the at least one communication network, the onboard processing component being further configured to compute the command signals and to communicate the command signals to an onboard control system of the associated one of the vehicles.

19. The system of claim 15, further comprising a simulation component operatively coupled to the processing component and configured to simulate one or more simulated vehicles, the processing component being further configured to determine the corresponding command signals based at least in part on a simulated characteristic of the one or more simulated vehicles.

20. The system of claim 19, wherein the simulated characteristic of the one or more simulated vehicles includes at least one of a simulated position characteristic, a simulated attitude characteristic, a simulated stability characteristic, a simulated dynamic characteristic, and a simulated health condition characteristic.

21. The system of claim 15, wherein the plurality of cameras are operatively disposed along at least a portion of a perimeter of the control volume.

22. The system of claim 15, wherein each of the one or more vehicles has a plurality of retro-reflective markers positioned thereon, and wherein the plurality of cameras are configured to detect at least some of the retro-reflective markers positioned on the one or more test vehicles.

23. The system of claim 22, wherein the plurality of cameras are configured to track the retro-reflective markers using at least one of a visible wavelength portion of the spectrum and an infrared wavelength portion of the spectrum.

24. A method of operating one or more vehicles within a control volume, comprising:

measuring one or more stability and control characteristics of the one or more vehicles using a position reference system including a plurality of measuring devices operatively disposed with respect to the control volume as the one or more vehicles operate within the control volume;

receiving the measured one or more stability and control characteristics from the position reference system;

determining a command signal based on the one or more stability and control characteristics measured using the position reference system;

transmitting the command signal to the one or more vehicles operating within the control volume to control the one or more stability and control characteristics of the one or more vehicles in a closed-loop system; and simulating one or more simulated vehicles to enable determination of an interoperability of the one or more simulated vehicles with respect to the one or more vehicles operating within the control volume to enable testing of new prototypes before deployment of a physical vehicle.

25. The method of claim 24, further comprising receiving health monitoring information from the one or more vehicles, and wherein determining a command signal includes determining a command signal based at least partially on the health monitoring information from the one or more vehicles.

26. The method of claim 25, wherein receiving health monitoring information includes receiving at least one of a characteristic of an onboard vehicle propulsion system, a characteristic of an onboard power system, and a functional degradation of an onboard sensor system.

27. The method of claim 26, wherein at least one of the vehicles includes a flight vehicle, and wherein the onboard vehicle propulsion system comprises one or more rotor assemblies configured to provide lift for the flight vehicle.

28. The method of claim 24, wherein:
receiving the measured one or more stability and control characteristics includes receiving the measured one or more stability and control characteristics using at least one communication network;
determining a command signal includes determining a command signal using a main processing component operatively coupled to the at least one communication network and reconditioning the command signal into a format suitable for use by the one or more vehicles; and
transmitting the command signal to the one or more vehicles includes transmitting the reconditioned command signals to the one or more vehicles.

29. The method of claim 24, wherein includes:
receiving the measured one or more stability and control characteristics includes receiving the measured one or more stability and control characteristics using at least one communication network;
a determining a command signal includes
receiving the measured one or more stability and control characteristics from the communication network into an onboard processing component positioned on an associated one of the vehicles; and
computing the command signal for the associated one of the vehicles using the onboard processing component.

30. The method of claim 29, wherein the onboard processing component further includes a health monitoring component configured to receive health monitoring information regarding the associated one of the vehicles, the onboard processing component being further configured to determine the command signal based at least partially on the health monitoring information.

31. The method of claim 25, wherein determining the command signal includes determining the command signal based at least in part on a simulated characteristic of the one or more simulated vehicles.

32. The method of claim 31, wherein determining the command signal includes determining the command signal based at least in part on at least one of a simulated position characteristic, a simulated attitude characteristic, a simulated stability characteristic, a simulated dynamic characteristic, and a simulated health condition characteristic.

33. The method of claim 24, wherein measuring one or more stability and control characteristics includes measuring one or more stability and control characteristics using a plurality of detection devices operatively distributed along at least a portion of a perimeter of the control volume, the detection devices being configured to determine six-degree-of-freedom information for each of the vehicles operating within the control volume.

34. The method of claim 33, wherein measuring one or more stability and control characteristics includes measuring one or more stability and control characteristics using a plurality of retro-reflective markers positioned on each of the one or more test vehicles.

35. The method of claim 34, wherein measuring one or more stability and control characteristics includes measuring one or more stability and control characteristics using a plurality of camera devices operating configured to track the retro-reflective markers using at least one of a visible wavelength portion of the spectrum and an infrared wavelength portion of the spectrum.

* * * * *